US012211416B2

(12) United States Patent
Rosset et al.

(10) Patent No.: US 12,211,416 B2
(45) Date of Patent: Jan. 28, 2025

(54) ESTIMATING A DELAY FROM A MONITOR OUTPUT TO A SENSOR

(71) Applicant: NeuraLight Ltd., Tel Aviv (IL)

(72) Inventors: Israel Rosset, Tel Aviv (IL); Eran Harpaz, Tel Aviv (IL); John Michael Rozmus, Manor, TX (US); Vladimir Anisimov, Tel Aviv (IL)

(73) Assignee: NeuraLight Ltd., Tel Aviv (IL)

( * ) Notice: Subject to any disclaimer, the term of this patent is extended or adjusted under 35 U.S.C. 154(b) by 0 days.

(21) Appl. No.: 18/404,045

(22) Filed: Jan. 4, 2024

(65) Prior Publication Data
US 2024/0233602 A1 Jul. 11, 2024

Related U.S. Application Data

(60) Provisional application No. 63/437,237, filed on Jan. 5, 2023.

(51) Int. Cl.
*G09G 3/20* (2006.01)
*H04N 23/74* (2023.01)

(52) U.S. Cl.
CPC ......... *G09G 3/2011* (2013.01); *G09G 3/2018* (2013.01); *H04N 23/74* (2023.01);
(Continued)

(58) Field of Classification Search
CPC .............. G09G 3/2011; G09G 3/2018; G09G 2320/0633; G09G 2320/064; G09G 2320/0646; H04N 23/74
See application file for complete search history.

(56) References Cited

U.S. PATENT DOCUMENTS 6,820,979 B1 11/2004 Stark et al.
7,428,320 B2 9/2008 Northcott et al.
(Continued)

FOREIGN PATENT DOCUMENTS

CA 2618352 A1 2/2007
CN 106265006 A 1/2017
(Continued)

OTHER PUBLICATIONS

Akinyelu, A.A. and Blignaut, P., "Convolutional Neural Network-Based Technique for Gaze Estimation on Mobile Devices," Frontiers in Artificial Intelligence 4:796825 11 pages, Frontiers Media SA, Switzerland (Jan. 2022).
(Continued)

*Primary Examiner* — Michael J Jansen, II
(74) *Attorney, Agent, or Firm* — Sterne, Kessler, Goldstein & Fox P.L.L.C.

(57) ABSTRACT

Disclosed herein are system, method, and computer program product embodiments, and/or combinations and sub-combinations thereof, for determining a time delay for synchronizing one or more parameters. In an embodiment, a plurality of frames is presented on a display device. A brightness level is modulated in one or more frames of the plurality of frames. A plurality of image frames of a face of a user is received. The plurality of image frames are obtained from a video stream recorded by an image sensor during the presentation of the plurality of frames on the display device. The plurality of image frames are processed to determine the time delay between when the modulating the brightness level is performed in the one or more frames and when the modulating the brightness level in the one or more frames is reported by the image sensor.

17 Claims, 10 Drawing Sheets

(52) U.S. Cl.
CPC .............. *G09G 2320/0633* (2013.01); *G09G 2320/064* (2013.01); *G09G 2320/0646* (2013.01)

(56) References Cited

U.S. PATENT DOCUMENTS

| | | |
|---|---|---|
| 7,753,525 B2 | 7/2010 | Hara et al. |
| 7,869,627 B2 | 1/2011 | Northcott et al. |
| 8,061,840 B2 | 11/2011 | Mizuochi |
| 8,132,916 B2 | 3/2012 | Johansson |
| 9,582,075 B2* | 2/2017 | Luebke ................ G06F 3/013 |
| 9,788,714 B2* | 10/2017 | Krueger ................ G06F 3/013 |
| 9,965,860 B2 | 5/2018 | Nguyen et al. |
| 10,016,130 B2 | 7/2018 | Ganesan et al. |
| 10,109,056 B2 | 10/2018 | Nguyen et al. |
| 10,231,614 B2 | 3/2019 | Krueger |
| 10,575,728 B2 | 3/2020 | Zakariaie et al. |
| 10,713,813 B2 | 7/2020 | De Villers-Sidani et al. |
| 10,713,814 B2 | 7/2020 | De Villers-Sidani et al. |
| 11,074,714 B2 | 7/2021 | De Villers-Sidani et al. |
| 11,295,664 B2* | 4/2022 | Chen ................ G06F 3/04166 |
| 11,382,545 B2 | 7/2022 | Zakariaie et al. |
| 11,503,998 B1* | 11/2022 | De Villers-Sidani ..... G06T 7/70 |
| 11,513,593 B2 | 11/2022 | Drozdov et al. |
| 11,514,720 B2 | 11/2022 | Haimovitch-Yogev et al. |
| 11,776,315 B2 | 10/2023 | Haimovitch-Yogev et al. |
| 12,100,163 B2* | 9/2024 | Syong ................ G06V 10/25 |
| 2005/0228236 A1 | 10/2005 | Diederich et al. |
| 2007/0009169 A1 | 1/2007 | Bhattacharjya |
| 2009/0018419 A1 | 1/2009 | Torch |
| 2011/0181776 A1 | 7/2011 | Mallinson |
| 2014/0320397 A1 | 10/2014 | Hennessey et al. |
| 2014/0364761 A1 | 12/2014 | Benson et al. |
| 2015/0022435 A1* | 1/2015 | Luebke ................ G06F 3/013 345/156 |
| 2015/0077543 A1 | 3/2015 | Kerr et al. |
| 2015/0293588 A1 | 10/2015 | Strupczewski et al. |
| 2016/0150955 A1 | 6/2016 | Kiderman et al. |
| 2016/0180811 A1 | 6/2016 | Colenbrander |
| 2016/0262608 A1* | 9/2016 | Krueger ................ G16H 40/63 |
| 2017/0135577 A1 | 5/2017 | Komogortsev |
| 2017/0151089 A1 | 6/2017 | Chernyak |
| 2017/0231490 A1 | 8/2017 | Toth et al. |
| 2017/0249434 A1 | 8/2017 | Brunner |
| 2018/0018515 A1 | 1/2018 | Spizhevoy et al. |
| 2018/0212684 A1 | 7/2018 | Aoyama et al. |
| 2018/0316844 A1* | 11/2018 | Hatcher, Jr. .......... H04N 23/661 |
| 2020/0085298 A1 | 3/2020 | Cornsweet et al. |
| 2020/0268296 A1 | 8/2020 | Alcaide et al. |
| 2020/0305708 A1 | 10/2020 | Krueger |
| 2020/0323480 A1 | 10/2020 | Shaked et al. |
| 2020/0405148 A1 | 12/2020 | Tran |
| 2021/0174959 A1 | 6/2021 | Abel Fernandez |
| 2021/0186318 A1 | 6/2021 | Yellin et al. |
| 2021/0186395 A1 | 6/2021 | Zakariaie et al. |
| 2021/0186397 A1 | 6/2021 | Weisberg et al. |
| 2021/0287602 A1* | 9/2021 | Chen ................ H04B 10/116 |
| 2021/0327595 A1 | 10/2021 | Abdallah |
| 2022/0019791 A1 | 1/2022 | Drozdov et al. |
| 2022/0206571 A1 | 6/2022 | Drozdov et al. |
| 2022/0211310 A1 | 7/2022 | Zakariaie et al. |
| 2022/0236797 A1 | 7/2022 | Drozdov et al. |
| 2022/0301294 A1 | 9/2022 | Boutinon |
| 2022/0313083 A1 | 10/2022 | Zakariaie et al. |
| 2022/0351545 A1 | 11/2022 | Ben-Ami et al. |
| 2022/0354363 A1 | 11/2022 | Ben-Ami et al. |
| 2022/0369923 A1* | 11/2022 | De Villers-Sidani ........ G06T 7/0016 |
| 2022/0390771 A1 | 12/2022 | David et al. |
| 2023/0022221 A1* | 1/2023 | Syong ................ G06T 7/248 |
| 2023/0043439 A1* | 2/2023 | Amirsolaimani .... G02B 26/103 |
| 2023/0074569 A1 | 3/2023 | Drozdov et al. |
| 2023/0113256 A1* | 4/2023 | Popp ................ H04N 7/183 348/207.99 |
| 2023/0233072 A1 | 7/2023 | Haimovitch-Yogev et al. |
| 2023/0334326 A1 | 10/2023 | Haimovitch-Yogev et al. |

FOREIGN PATENT DOCUMENTS

| | | |
|---|---|---|
| EP | 1947604 A1 | 7/2008 |
| WO | WO-2020235939 A2 | 11/2020 |
| WO | WO-2021097300 A1 | 5/2021 |

OTHER PUBLICATIONS

Ali, E., et al., "Pupillary Response to Sparse Multifocal Stimuli in Multiple Sclerosis Patients," Multiple Sclerosis Journal 20(7): 1-8, (Nov. 2013).

Aljaafreh, A., et al., "A Low-cost Webcam-based Eye Tracker and Saccade Measurement System," International Journal of Circuits, Systems and Signal Processing 14:102-107, (Apr. 2020).

Alnajar, F., et al., "Auto-Calibrated Gaze Estimation Using Human Gaze Patterns," International Journal of Computer Vision 124:223-236, (2017).

Bafna, T., et al., "EyeTell: Tablet-based Calibration-free Eye-typing Using Smooth-pursuit Movements," Proceedings of the ETRA '21 Short Papers, (2021).

Bedell, H., et al., "Eye Movement Testing in Clinical Examination," Vision Research 90:32-37, Elsevier Science Limited, United Kingdom (Sep. 2013).

Bijvank, J.A.N., et al., "Quantification of Visual Fixation in Multiple Sclerosis," Investigative Ophthalmology & Visual Science 60(5):1372-1383, Association for Research in Vision and Ophthalmology (Arvo), United States (Apr. 2019).

Borza, D., et al., "Real-Time Detection and Measurement of Eye Features from Color Images," Sensors 16(7):1105 1-24, MDPI, Switzerland (Jul. 2016).

Chen, S. and Epps, J., "Eyelid and Pupil Landmark Detection and Blink Estimation Based on Deformable Shape Models for Near-Field Infrared Video," Frontiers in ICT 6:18 1-11, (Oct. 2019).

Cherng, Y., et al., "Background Luminance Effects on Pupil Size Associated With Emotion and Saccade Preparation," Scientific Reports 10(1):15718 11 Pages, Nature Publishing Group, United Kingdom (Sep. 2020).

Chernov, N., et al., "Fitting Quadratic Curves to Data Points," British Journal of Mathematics & Computer Science 4(1):33-60, (2014).

De Almeida Junior, F.L., et al., "Image Quality Treatment to Improve Iris Biometric Systems," Infocomp Journal of Computer Science 16(1-2):21-30, (2017).

De Seze, J., et al., "Pupillary Disturbances in Multiple Sclerosis: Correlation With MRI Findings," Journal of the Neurological Sciences 188(1-2):37-41, Elsevier, Netherlands (Jul. 2001).

Derwenskus, J., et al., "Abnormal Eye Movements Predict Disability in MS: Two-year Follow-up," Annals of the New York Academy of Sciences 1039:521-523, Blackwell, United States (Apr. 2005).

Felmingham, K., "Eye Tracking and PTSD," Comprehensive Guide to Post-traumatic Stress Disorder Chapter 69:1241-1256, (Jan. 2015).

Ferreira, M., et al., "Using Endogenous Saccades to Characterize Fatigue in Multiple Sclerosis," Multiple Sclerosis and Related Disorders 14:16-22, Elsevier B. V., Netherlands (May 2017).

Fielding, J., et al., "Ocular Motor Signatures of Cognitive Dysfunction in Multiple Sclerosis," Nature Reviews. Neurology, 11(11):637-645, Nature Publishing Group, United Kingdom (Nov. 2015).

Fink, L., et al., "From Pre-processing to Advanced Dynamic Modeling of Pupil Data," Behavior Research Methods 37 Pages, Springer, United States (Jun. 2023).

Frohman, E.M., et al., "Quantitative Oculographic Characterisation of Internuclear Ophthalmoparesis in Multiple Sclerosis: the Versional Dysconjugacy Index Z Score," Journal of Neurology, Neurosurgery, and Psychiatry 73(1):51-55, BMJ Publishing Group, United Kingdom (Jul. 2002).

(56) References Cited

OTHER PUBLICATIONS

Frohman, E.M., et al., "The Neuro-Ophthalmology of Multiple Sclerosis", The Lancet Neurology, 4(2):111-121, Lancet Public Group, United Kingdom (Feb. 2005).

Frohman, T.C., et al., "Accuracy of Clinical Detection of INO in MS: Corroboration With Quantitative Infrared Oculography," Neurology 61(6):848-850, Lippincott Williams & Wilkins, United States (Sep. 2003).

Grillini, A., et al., "Eye Movement Evaluation in Multiple Sclerosis and Parkinson's Disease Using a Standardized Oculomotor and Neuro-Ophthalmic Disorder Assessment (SONDA)," Frontiers in Neurology 11:971 1-15, Frontiers Research Foundation, Switzerland (Sep. 2020).

Guri, M., et al., "Brightness: Leaking Sensitive Data from Air-Gapped Workstations via Screen Brightness," IEEE 12th CMI Conference on Cybersecurity and Privacy 7 pages, (2020).

Hasasneh, A., et al., "Deep Learning Approach for Automatic Classification of Ocular and Cardiac Artifacts in Meg Data," Hindawi Journal of Engineering 10 Pages, (Apr. 2018).

Hoffner, S., et al., "Gaze Tracking Using Common Webcams," Osnabruck University, (Feb. 2018).

Holzman, P.S., et al., "Eye-tracking Dysfunctions in Schizophrenic Patients and Their Relatives," Archives of General Psychiatry 31(2):143-151, American Medical Association, United States (Aug. 1974).

Hooge, I.T.C., et al., "Gaze Tracking Accuracy in Humans: One Eye is Sometimes Better Than Two," Behavior Research Methods 51(6):2712-2721, Springer, United States (Dec. 2019).

Hou, L., et al., "Illumination-Based Synchronization of High-Speed Vision Sensors," Sensors 10(6):5530-5547, Basel, Switzerland (2010).

Hutt, S. and D'Mello, S.K., "Evaluating Calibration-free Webcam-based Eye Tracking for Gaze-based User Modeling," ICMI '22: Proceedings of the 2022 International Conference on Multimodal Interaction 224-235, (Nov. 2022).

International Search Report and Written Opinion for Application No. PCT/US2022/027201, mailed on Sep. 19, 2022, 10 pages.

International Search Report and Written Opinion for Application No. PCT/US2022/027312, mailed on Oct. 27, 2022, 10 pages.

Jacobsen, J., "Pupillary Function in Multiple Sclerosis," Acta Neurologica Scandinavica 82(6):392-395, Wiley-Blackwell, Denmark (Dec. 1990).

Jamaludin, S., et al., "Deblurring of Noisy Iris Images in Iris Recognition," Bulletin of Electrical Engineering and Informatics (BEEI) 10(1):156-159, (Feb. 2021).

Joyce, D.S., et al., "Melanopsin-mediated Pupil Function is Impaired in Parkinson's Disease," Scientific Reports 8(1):7796, Nature Publishing Group, United Kingdom (May 2018).

Kelbsch, C., et al., "Standards in Pupillography," Frontiers in Neurology 10(129):1-26, Frontiers Research Foundation, Switzerland (Feb. 2019).

Krafka, K., et al., "Eye Tracking for Everyone," The IEEE Conference on Computer Vision and Pattern Recognition (CVPR) 9 Pages, (Jun. 2016).

Lai, H., et al., "Measuring Saccade Latency Using Smartphone Cameras," IEEE Journal of Biomedical and Health Informatics 24(3):1-13, Institute of Electrical and Electronics Engineers, United States (Mar. 2020).

Liu, G., et al., "A Differential Approach for Gaze Estimation," IEEE transactions on pattern analysis and machine intelligence 43(3):1092-1099, IEEE Computer Society, United States (Mar. 2021).

Liu, J., et al., "Iris Image Deblurring Based on Refinement of Point Spread Function," Chinese Conference on Biometric Recognition (CCBR), Lecture Notes in Computer Science 7701:184-192, (Dec. 2012).

Lizak, N., et al., "Impairment of Smooth Pursuit as a Marker of Early Multiple Sclerosis," Frontiers in Neurology 7(3):206 1-7, Frontiers Research Foundation, Switzerland (Nov. 2016).

Mahanama, B., et al., "Eye Movement and Pupil Measures: a Review," Frontiers in Computer Science 3:733531 1-12, (Jan. 2022).

Matza, L.S., "Multiple Sclerosis Relapse: Qualitative Findings From Clinician and Patient Interviews," Multiple Sclerosis and Related Disorders 27 Pages, Elsevier B. V., Netherlands (Jan. 2019).

Model, D., "A Calibration Free Estimation of the Point of Gaze and Objective Measurement of Ocular Alignment in Adults and Infants," University of Toronto 160 pages, (2011).

Mollers, Maximilian., "Calibration-Free Gaze Tracking an Experimental Analysis," RWTH Aachen University 111 pages, (2007).

Niestroy, A., "Neuro-ophthalmologic Aspects of Multiple Sclerosis: Using Eye Movements as a Clinical and Experimental Tool," Clinical Ophthalmology 1(3):267-272, Dove Medical Press, New Zealand (Sep. 2007).

Park, S., et al., "Few-Shot Adaptive Gaze Estimation," Proceedings of the IEEE/CVF International Conference on Computer Vision (ICCV), 13 pages, (2019).

Patel, A.S., et al., "Optical Axes and Angle Kappa," American Academy of Ophthalmology, (Oct. 2021).

Peysakhovich, V., et al., "The Impact of Luminance on Tonic and Phasic Pupillary Responses to Sustained Cognitive Load," International Journal of Psychophysiology 112:40-45, Elsevier, Netherlands (Feb. 2017).

Pfeuffer, K., et al., "Pursuit Calibration: Making Gaze Calibration Less Tedious and More Flexible," UIST 13 Proceedings of the 26th Annual Acm Symposium on User Interface Software and Technology 261-270, (Oct. 2013).

Pi, J. and Shi, B.E., et al., "Task-embedded Online Eye-tracker Calibration for Improving Robustness to Head Motion," Proceedings of the 11th ACM Symposium on Eye Tracking Research & Applications ETRA '19 8:1-9, (Jun. 2019).

Polak, P.E., et al., "Locus Coeruleus Damage and Noradrenaline Reductions in Multiple Sclerosis and Experimental Autoimmune Encephalomyelitis," Brain 134(Pt 3):665-677, Oxford University Press, United Kingdom (Mar. 2011).

Rasulo, F.A., et al., "Essential Noninvasive Multimodality Neuromonitoring for the Critically Ill Patient," Critical Care 24(1):100 12 Pages, BioMed Central Ltd, United Kingdom (Mar. 2020).

Rayner, K., "Eye Movements in Reading and Information Processing: 20 Years of Research," Psychological Bulletin 124(3):372-422, American Psychological Association, United States (Nov. 1998).

Rodrigues, A.C., "Response Surface Analysis: A Tutorial for Examining Linear and Curvilinear Effects," Journal of Contemporary Administration 25(6):1-14, (Apr. 2021).

Romero, K., et al., "Neurologists' Accuracy in Predicting Cognitive Impairment in Multiple Sclerosis," Multiple Sclerosis and Related Disorders 4(4):291-295, Elsevier B. V., Netherlands (Jul. 2015).

Schuler, C.J., "Machine Learning Approaches to Image Deconvolution," Dissertation University of Tubingen 142 Pages, Germany (2017).

Schweitzer, R and Rolfs, M., "An Adaptive Algorithm for Fast and Reliable Online Saccade Detection," Behavior Research Methods 52(3):1122-1139, Springer, United States (Jun. 2020).

Serra, A., et al., "Eye Movement Abnormalities in Multiple Sclerosis: Pathogenesis, Modeling, and Treatment," Frontiers in Neurology 9:31 1-7, Frontiers Research Foundation, Switzerland (Feb. 2018).

Serra, A., et al., "Role of Eye Movement Examination and Subjective Visual Vertical in Clinical Evaluation of Multiple Sclerosis," Journal of Neurology 250(5):569-575, Springer-Verlag, Germany (May 2003).

Servillo, G., et al., "Bedside Tested Ocular Motor Disorders in Multiple Sclerosis Patients," Multiple Sclerosis International 2014:732329 1-5, Hindawi Publishing Corporation, Egypt (Apr. 2014).

Sheehy, C.K., et al., "Fixational Microsaccades: a Quantitative and Objective Measure of Disability in Multiple Sclerosis," Multiple Sclerosis 26(3):1-11, SAGE Publications, United Kingdom (Mar. 2020).

Smith, J.D., "Viewpointer: Lightweight Calibration-free Eye Tracking for Ubiquitous Handsfree Deixis," UIST 05: Proceedings of the 18th Annual ACM Symposium on User Interface Software and Technology, 84 pages (2005).

Strobl, M.A.R., et al., "Look Me in the Eye: Evaluating the Accuracy of Smartphone-based Eye Tracking for Potential Appli-

(56) References Cited

OTHER PUBLICATIONS cation in Autism Spectrum Disorder Research," Biomedical Engineering Online 18(1):51 1-12, BioMed Central, United Kingdom (May 2019).

System and Method for Measuring Delay from Monitor Output to Camera Sensor, Unpublished Disclosure; 16 pages.

Teikari, P., et al., "Embedded Deep Learning in Ophthalmology: Making Ophthalmic Imaging Smarter," Therapeutic Advances in Ophthalmology 11: 21 Pages, Sage Publications Limited, United States (Mar. 2019).

Tur, C., et al., "Assessing Treatment Outcomes in Multiple Sclerosis Trials and in the Clinical Setting," Nature Reviews. Neurology 14(2):164 Pages, Nature Publishing Group, United Kingdom (Feb. 2018).

Valliappan, N., et al., "Accelerating Eye Movement Research via Accurate and Affordable Smartphone Eye Tracking," Nature Communications 11(1):4553 1-12, Nature Publishing Group, United Kingdom (Sep. 2020).

Valliappan, N., et al., "Accelerating Eye Movement Research via Accurate and Affordable Smartphone Eye Tracking," Supplementary Information, 18 pages, (Jul. 2020).

Van Munset, C.E.P., et al., "Outcome Measures in Clinical Trials for Multiple Sclerosis," CNS Drugs 31(3):217-236, Springer International, New Zealand (Mar. 2017).

Villers-Sidani, E.D., et al., "A Novel Tablet-based Software for the Acquisition and Analysis of Gaze and Eye Movement Parameters: A Preliminary Validation Study in Parkinson's Disease," Frontiers in Neurology 14(1204733):1-10 , Frontiers Research Foundation, Switzerland (Jun. 2023).

Villers-Sidani, E.D., et al., "Oculomotor Analysis to Assess Brain Health: Preliminary Findings From a Longitudinal Study of Multiple Sclerosis Using Novel Tablet-based Eye-tracking Software," Frontiers in Neurology 14(1243594): 1-11, Frontiers Research Foundation, Switzerland (Sep. 2023).

Wang, K. and JI, Qiang., "3D Gaze Estimation Without Explicit Personal Calibration," Pattern Recognition 70:216-227, Elsevier, (Jul. 2018).

Williams, B.M., et al., "Fast Blur Detection and Parametric Deconvolution of Retinal Fundus Images," Fetal, Infan and Ophthalmic Medical Image Analysis 8 Pages, Springer, Cham. (2017).

Yang, T., et al., "Gaze Angle Estimate and Correction in Iris Recognition," IEEE Symposium on Computational Intelligence in Biometrics and Identity Management (CIBIM) 7 Pages, (Dec. 2014).

Zammarchi, G., et al., "Application of Eye Tracking Technology in Medicine: a Bibliometric Analysis," Vision 5(4):56 1-14, MDPI AG, Switzerland (Nov. 2021).

Zhang, Y., et al., "Luminance Effects on Pupil Dilation in Speech-in-noise Recognition," PloS one 17(12):e0278506 1-18, Public Library of Science, United States (Dec. 2022).

International Search Report and Written Opinion of the International Searching Authority directed to International Patent Application No. PCT/IB2024/050087, mailed Mar. 26, 2024; 13 pages.

\* cited by examiner

ESTIMATING A DELAY FROM A MONITOR OUTPUT TO A SENSOR

CROSS REFERENCE TO RELATED PATENT APPLICATION

This application claims the benefit of U.S. Provisional Patent Application No. 63/437,237, entitled "SYSTEM AND METHOD FOR MEASURING DELAY FROM MONITOR OUTPUT TO CAMERA SENSOR," filed on Jan. 5, 2023, the entire contents of which are incorporated by reference herein in their entirety.

FIELD

The present disclosure is generally directed to estimating a delay from a monitor output to an image sensor. In particular, the present disclosure relates to estimating a time delay between presenting an output on a display device and detecting a video frame indicative of a user reaction to the output.

BACKGROUND

Progression of neurological disorders may be determined using minute eye movements. Typically, these eye movements are measured in well-controlled lab settings (e.g., no movements, controlled ambient light, or other such parameters) using dedicated devices (e.g., infrared eye trackers, pupilometers, or other such devices). However, the dedicated devices are challenging to set up, cost prohibitive, or may involve a significant amount of time and effort to create or maintain the controlled lab setup. Such challenges may discourage the continuous monitoring of the progression of neurological disorders.

Continuous monitoring may help in early detection, treating, and caring for individuals that suffer from neurological disorders or mental health conditions.

SUMMARY

Provided herein are system, apparatus, article of manufacture, method and/or computer program product embodiments, and/or combinations and sub-combinations thereof, for efficiently determining a time delay to synchronize one or more parameters. An example embodiment presents a plurality of frames on a display device, modulates a brightness level in one or more frames of the plurality of frames, and receives a plurality of image frames of a face of a user. The plurality of image frames is obtained from a video stream recorded by an image sensor during the presentation of the plurality of frames on the display device. The embodiment further processes the plurality of image frames to determine the time delay between when the modulating the brightness level is performed in the one or more frames of the plurality of frames and when the modulating the brightness level in the one or more frames of the plurality of frames is reported by the image sensor.

Further features of the present disclosure, as well as the structure and operation of various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF DRAWINGS

The accompanying drawings, which are incorporated herein and form part of the specification, illustrate the present disclosure and, together with the description, further serve to explain the principles of the present disclosure and to enable a person skilled in the relevant art(s) to make and use embodiments described herein.

Figure 1:
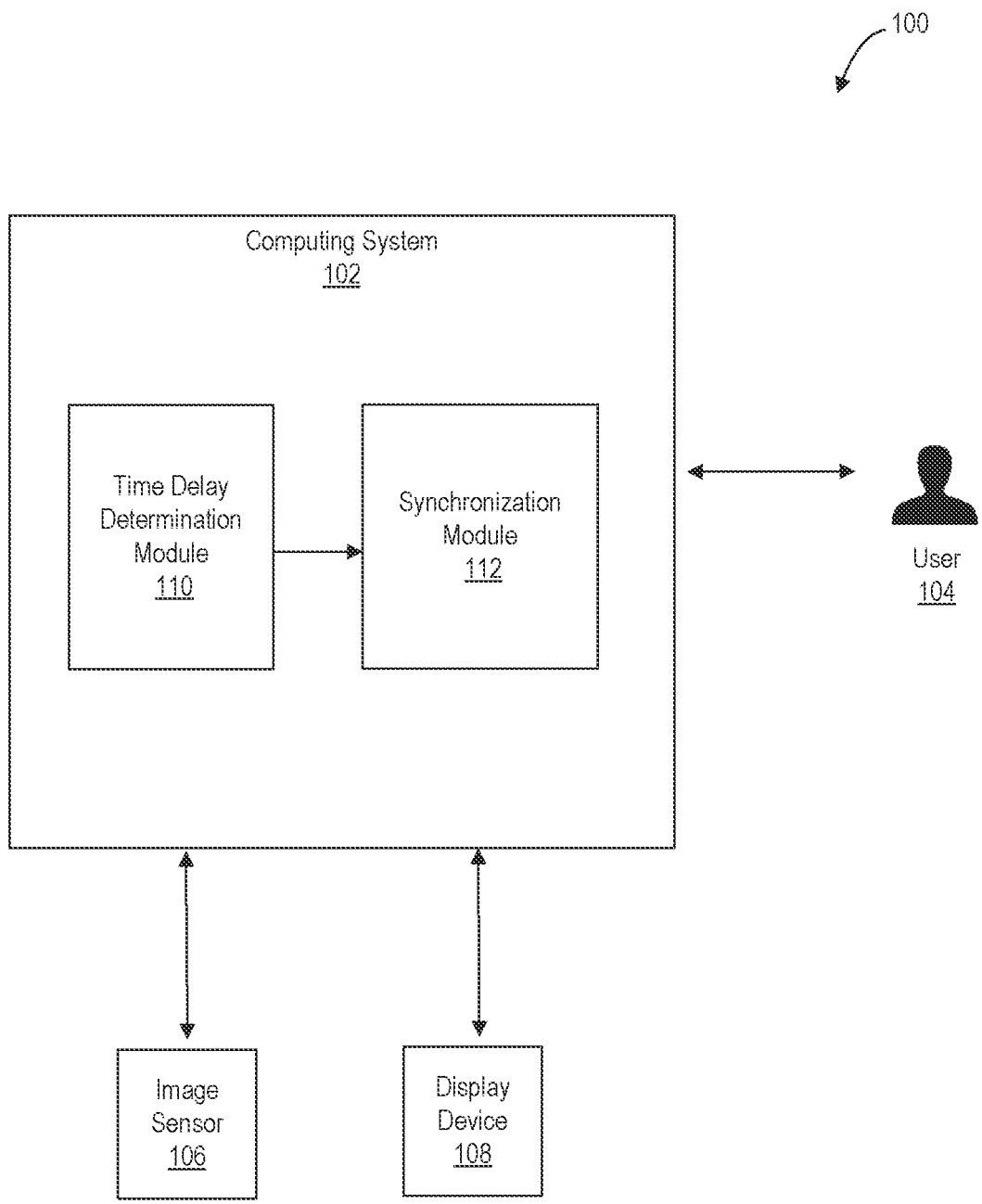
FIG. 1 is a block diagram of a system for estimating a time delay from a monitor output to a sensor, according to some embodiments.

The features of the present disclosure will become more apparent from the detailed description set forth below when takin in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawings in which the reference number first appears. Unless otherwise indicated, the drawings provided throughout the disclosure should not be interpreted as to-scale drawings.

DETAILED DESCRIPTION

Aspects of the present disclosure relate to a system for estimating a time delay from a display device (e.g., a monitor output) to an image sensor. In particular, the present disclosure relates to estimating a time delay between when a modulation is presented on the display device and a reception of the modulation by the image sensor.

This specification discloses one or more embodiments that incorporate the features of the present disclosure. The disclosed embodiment(s) are provided as examples. The scope of the present disclosure is not limited to the disclosed embodiment(s). Claimed features are defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "about," "approximately," or the like may be used herein to indicate a value of a quantity that may vary or be found to be within a range of values, based on a particular technology. Based on the particular technology, the terms may indicate a value of a given quantity that is within, for example, 1-20% of the value (e.g., ±1%, ±5% ±10%, ±15%, or ±20% of the value).

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/ or instructions may be described herein as performing certain actions. However, it should be appreciated that such descriptions are merely for convenience and that such actions in fact result from computing devices, processors, controllers, or other devices executing the firmware, software, routines, instructions, etc. In the context of computer storage media, the term "non-transitory" may be used herein to describe all forms of computer readable media, with the sole exception being a transitory, propagating signal.

As noted in the Background section above, neurological disorders may be determined using minute eye movements. Typically, these eye movements are measured in well-controlled lab settings (e.g., no movements, controlled ambient light, or other such parameters) using dedicated devices (e.g., infrared eye trackers, pupilometers, or other such devices). However, setting up and maintaining such a controlled test environment may be extremely costly, and may require a significant amount of time and effort. Furthermore, because there exist only a limited number of such well-controlled lab settings, it may be difficult to schedule appointments and/or travel thereto.

It would be desirable to make eye movement measurements available at low cost by, for example, using the ubiquitous cameras included in smartphones, tablets, laptop computers, desktop computers and the like, to observe the behavior of eyes in response to a visual stimulus. Using the eye movement measurements, digital markers indicative of a neurological condition or a mental health condition may be determined.

Time delays (e.g., lags) between when the visual stimulus is presented to a user (e.g., a subject ongoing testing or monitoring) on a display device and when a reaction of the user is detected by an image sensor may affect the accuracy of the eye movement measurements. For example, a saccadic latency of user may be determined using the eye movement measurements obtained while a gaze response stimulus is shown on the display device. The saccadic latency is measured in a range from about 150 to about 250 milliseconds. In some aspects, a time delay from the display device to a computing system (e.g., an application software) that receives and analyzes images of a face of the user to determine the eye movement measurements may be about 50 to about 100 milliseconds or more with variation of +/− many tens of milliseconds. Additional delays such as network delays or server delays may also affect the accuracy of the eye movement measurements. In addition, a computer processor used for determining the digital markers or the eye movement measurements may have unpredictable delays (e.g., due to other resource-intensive applications or high demand for available memory). These delays cannot be pre-estimated. Thus, it is desired to adjust the eye movement measurements to account for such delays in order to improve the accuracy of the measurements.

Multiple factors may contribute to the time delay. In some aspects, the image sensor and the display device are not synchronized. This may cause a relatively slow frequency drift that contributes to variations in a cumulative processing time. In addition, frames may be occasionally dropped at either the display device or the image sensor. The variations may be due to different types of image sensors and/or display devices used for continuous monitoring of progression of neurological disorders. For example, image sensors may include a wide-range of cameras used in smartphones, tablets, laptops, desktop computers, etc. Further, due to different types of image devices used, the software measuring eye movement may not control an exposure time of the image sensor. In addition, the exposure level of each image frame may not be readily available.

In some aspects, illumination of an environment of the user may vary. For example, illumination in an indoor environment may vary from a softly lit room to a brightly lit room. Indoor light level may vary from about 200 lux to about 2000 lux. Furthermore, illuminance in an indoor environment may change rapidly. For example, lights may be turned on or off, curtains may be opened or closed which cause fast changes in strong light coming through a window, etc.

Embodiments described herein address some or all of the foregoing issues by determining a time delay between when a pattern is sent to a display device and when the effect of that pattern is detected in a video of the user. Embodiments described herein may modulate a brightness level and/or color of the display device and then detect an effect of the modulation in one or more frames of the face of the user. In some aspects, the modulation of the brightness level may affect the illumination of the face of the user. In turn, a brightness measurement in one or more image frames of the user is changed due to the change in the illumination. The brightness measurement may correspond to the brightness of the pixels associated with the face of the user. In some aspects, the brightness measurement may correspond to the brightness of all the pixels of the image frame when the background behind the subject is close, has sufficient reflectance, and is stable. In the framework of communications theory, this modulation may be considered to be a transmission of information through a communications channel to be received and interpreted by the programmed application software. Specifically, the software is configured to detect the earliest moment that a designated change in the brightness modulation arrives at the image sensor. The modulation of the display is selected large enough for good detection and frequent enough to track changing cumulative processing delay, but in one embodiment, is not visible to the user so as to annoy or distract the user.

FIG. 1 is a block diagram of a system 100 for estimating a time delay from a display device 108 to an image sensor 106, according to some embodiments. System 100 may include a computing system 102, image sensor 106, and display device 108.

Display device 108 may be a device that is capable of rendering images generated or acquired by computing system 102 such that a user 104 may visually perceive them. Display device 108 may include a display screen integrated with computing system 102 (e.g., an integrated display of a smartphone, a tablet computer, or a laptop computer) or a monitor separated from but communicatively coupled to computing system 102 (e.g., a monitor connected to a desktop computer via a wired connection) or a projector system (e.g., a projection screen and a projector comprising a light source). Display device 108 may also comprise display panels of a standalone or tethered extended reality headset. In one example, display device 108 may be a color display monitor with a display rate of 60 frames per second (FPS). In some aspects, display device 108 may display a plurality of frames generated by computing system 102. In some aspects, the plurality of frames may be received by display device 108 via a network.

The network may be a telecommunications network, such as a wired or wireless network. The network can span and represent a variety of networks and network topologies. For example, the network can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network. Cable, Ethernet, digital subscriber line (DSL), fiber optic lines, fiber to the home (FTTH), and plain old telephone service (POTS) are examples of wired communication that may be included in the network. Further, the network can traverse a number of topologies and distances. For example, the network can include a direct connection, personal area network (PAN), local area network (LAN), metropolitan area network (MAN), wide area network (WAN), or a combination thereof.

In some aspects, image sensor 106 may be an optical device that is capable of capturing and storing images and videos. Image sensor 106 may comprise, for example, a digital camera that captures images and videos via an electronic image sensor. Image sensor 106 may be integrated with computing system 102 (e.g., an integrated camera of a smartphone, a tablet computer, or a laptop computer) or part of a device that is separate from but communicatively coupled to computing system 102 (e.g., a USB camera or webcam connected to a desktop computer via a wired connection). In one example, image sensor 106 may be a video camera. The video camera may operate at a rate of 60 FPS. In some aspects, image sensor 106 may transmit the captured images or videos via the network.

As described previously herein, computing system 102 may be a mobile device, a laptop computer, or a desktop computer. In some aspects, computing system 102 may operate on one or more servers and/or databases. The servers may be a variety of centralized or decentralized computing devices. For example, a server may be grid-computing resources, a virtualized computing resource, peer-to-peer distributed computing devices, or a combination thereof. The servers may be centralized in a single room, distributed across different rooms, distributed across different geographic locations, or embedded within the network. In some embodiments, computing system 102 may be implemented using computer system 700 described with reference to FIG. 7. Computing system 102 may provide a cluster computing platform or a cloud computing platform to perform eye movement measurements based on image frames received or acquired from image sensor 106. Computing system 102 may determine a time delay and adjust the eye movement measurements based on the time delay.

Computing system 102 may generate and send a plurality of frames to display device 108. Computing system 102 may store a plurality of transmit timestamps. Each transmit timestamp may correspond to when a respective frame is transmitted. In some aspects, computing system 102 may also transmit display brightness data corresponding to the plurality of frames.

Image sensor 106 may record a video of user 104 while the plurality of frames are displayed on display device 108. Computing system 102 may acquire the video from image sensor 106. Image sensor 106 may include a plurality of image frames. Computing system 102 may also determine and store a plurality of receive timestamps. The plurality of receive timestamps may correspond to a time when each image frame of the video is received by computing system 102.

User 104 may be a person interacting with computing system 102. In one embodiment, user 104 may be the person or the subject undergoing oculometric testing or monitoring. The testing may include determining an oculomotor ability of user 104. The oculometric may include a test to determine the saccadic latency of the user. These are only examples and other types of oculometric tests may be applied to user 104. In some aspects, user 104 may be a person interacting with a virtual reality system (e.g., playing a virtual reality game) where a reaction of the user to a stimulus is determined and used to control one or more parameters.

As discussed above, there may be a large variation in cumulative processing times in generating the frames to display device 108 and in receiving the image frames from image sensor 106. This large variation results from variation in multiple stages of software and hardware processing. For example, computing system 102 may send frames (display frames) to display device 108. As discussed above, computing system 102 may record a transmit timestamp for each frame. After receiving the frames, a driver (e.g., monitor driver) of display device 108 may control display device 108 to show the frames. Image sensor 106 may integrate light reflected from a face of user 104. Image sensor 106 may transfer the captured images to computing system 102. In some aspects, image sensor 106 may transmit pixel values via an image sensor interface (e.g., mobile industry processor interface (MIPI)) to a USB controller. The USB controller may be associated with computing system 102. The USB controller may transmit pixel values through a USB interface to a memory of computing system 102. The pixels may be transmitted in a densely packed format via direct memory access (DMA) to the memory of computing system 102. Computing system 102 may process the pixel values. For example, computing system 102 may reformat the pixels. In some aspects, the pixel values may be stored in a first in first out (FIFO) buffer in a main memory of computing system 102. Computing system 102 may read the pixel values for the image frames from the FIFO buffer and associate a corresponding receive timestamp for each frame.

In some aspects, computing system 102 may include a time delay determination module 110 and a synchronization module 112. Time delay determination module 110 and synchronization module 112 may be implemented by processing logic that can comprise hardware (e.g., circuitry, dedicated logic, programmable logic, microcode), software (e.g., instructions executed by one or more processors of computing system 102), or a combination thereof.

In order to determine the time delay, time delay determination module 110 may change the brightness level in the plurality of frames. Simultaneously to changing the brightness level in the frames, image sensor 106 may capture a face of user 104. Time delay determination module 110 may analyze the image frames received from image sensor 106 to determine a time delay between when the brightness level is changed and when the change in the brightness level is reported by image sensor 106.

In order to determine when the brightness level is reported by image sensor 106, time delay determination module 110 may determine a brightness measurement for pixels that correspond to the face of user 104. In order to identify the pixels that correspond to the face of user 104, time delay determination module 110 may implement one or more face recognition or detection techniques. Face recognition and detection techniques may include traditional face detection (e.g., elastic graph matching, singular value decomposition (SVD), Viola-Jones), artificial neural network (e.g., deep convolutional neural network), or three dimensional (3D) face recognition techniques.

In some aspects, a driver of display device 108 may control the brightness based on the brightness data received with or included with the plurality of frames. For example in a projection system, a driver of a light source (e.g., lamp) can control the brightness of an illumination light emitted from the light source or the brightness of a projection image by adjusting the lamp power. In some aspects, brightness data may include signals to control drivers of pixels or subpixels (e.g., red, green, and blue) of display device 108.

In some aspects, the time delay determined by time delay determination module 110 may include a network delay and/or a server delay. This provides the advantage of improving accuracy and reducing computing inefficiencies (e.g., the network and/or server delays are not calculated separately). The network delay may represent delays from receiving and transmitting data to a cloud server when computing system 102 is implemented as a server in a cloud computing network that receives image frames from image sensor 106 and transmit frames to display device 108. The delays may include a connection establishment delay, a round trip network delay, a data transfer time, and the like. The server delay may include a connection time, a window exhaustion metric, and the like.

As described previously herein, computing system 102 may be used to determine an oculomotor ability of user 104. Computing system 102 may transmit to display device 108 one or more frames corresponding to a visual stimulus. For example, user 104 may be told to gaze directly at a fixation point on the display as the display is instantaneously switched from the first fixation point to the second (referred to as a gaze response stimulus or a saccade test) as described in relation to FIGS. 2A and 2B. Image sensor 106 may capture an image of the face of the user 104 while the plurality of frames are displayed on display device 108. Further, computing system 102 may extract an eye region from the image of the face of user 104. Computing system 102 may analyze the eye region to determine one or more eye movement measurements or other oculometric parameters. Computing system 102 may determine a saccadic latency based on the eye movement measurements. The saccadic latency is the time from the presentation of the second point of fixation to the start of the saccade. Based on the saccadic latency and/or other oculometric parameters, computing system 102 may determine one or more digital markers that may be indicative of a neurological condition or a mental health condition of user 104.

Synchronization module 112 may modify one or more oculometric parameters to account for the time delay. The time delay may be received from the time delay determination module 110. For example, one or more oculometric parameters or other eye tracking data may be stored as a time series. A time associated with each parameter may be shifted by the time delay (i.e., x milliseconds) to compensate for the lag or time delay.

Figure 2A:
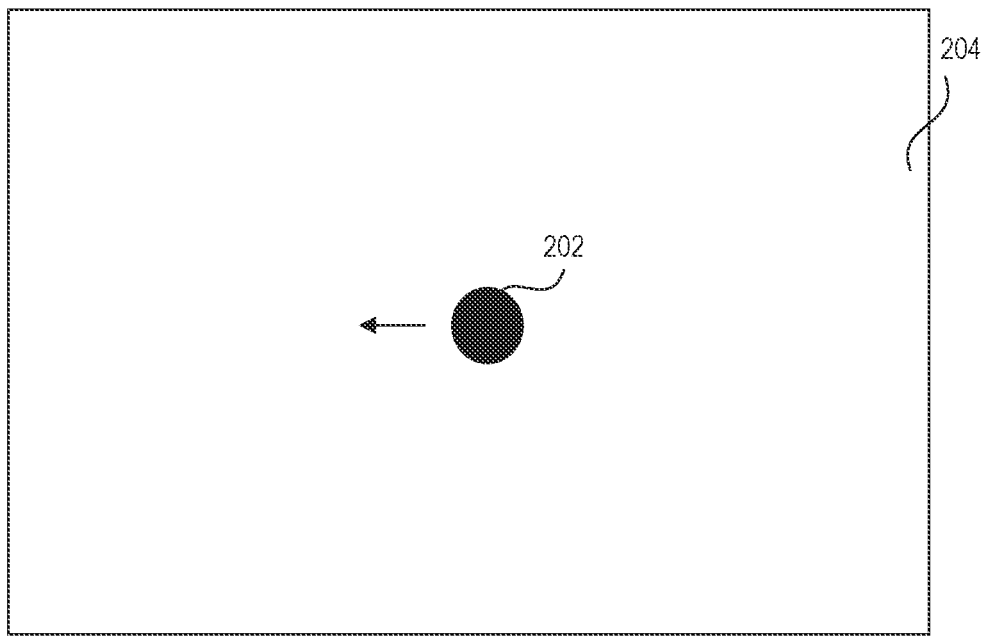
FIG. 2A is a schematic that illustrates a gaze response stimulus on a display area, according to some embodiments.
Figure 2B:
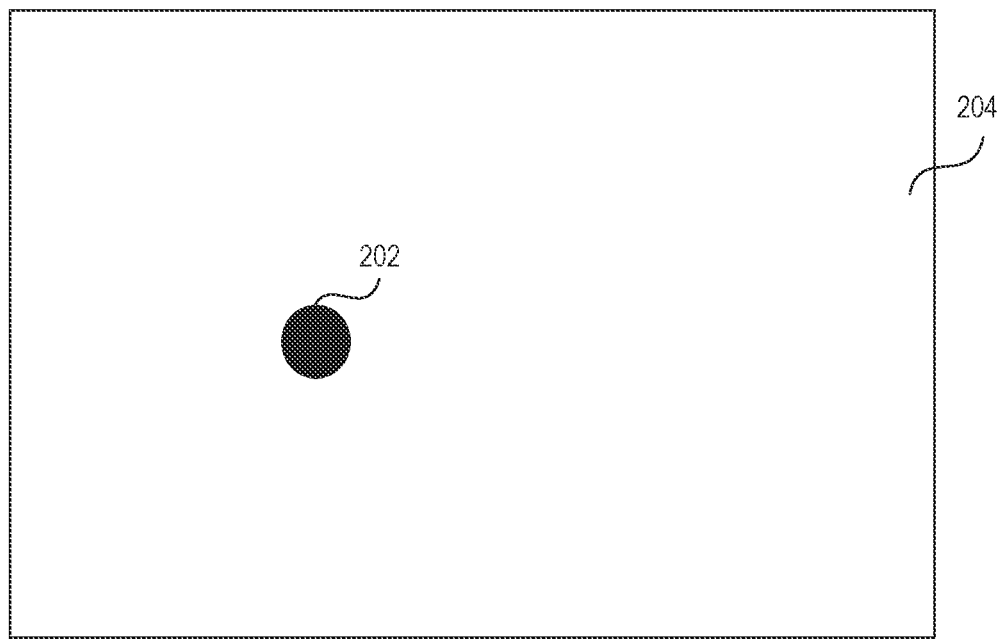
FIG. 2B is a schematic that illustrates a gaze response stimulus on a display area, according to some embodiments.

FIG. 2A illustrates a gaze response stimulus displayed on display device 108 at the start of the gaze tracking test such as a saccade test, according to some embodiments. FIG. 2B illustrates the gaze response stimulus displayed on display device 108 at the end of the gaze tracking test, according to some embodiments. A saccade is a rapid movement of the eye between two fixation points. The saccade test measures the ability of a subject to move the eye (or eyes) from one fixation point to another in a single, quick movement. In some aspects, the gaze response test may comprise displaying a first image on display device 108. The first image may include a target 202 (e.g., a dot) on a background 204. The background can be a solid background (a solid uniform color). Target 202 may have a display attribute different from background 204, for example, a different color or intensity. Target 202 may be displayed at a first position. In a second image displayed on display device 108, target 202 can be at a second position as shown in FIG. 2B. Target 202 may move along a vertical direction and/or a horizontal direction. Target 202 may be moved from left to right, from right to left, from up to down, from down to up, or in a diagonal direction. In some aspects, target 202 may move in a circle. Target 202 may move at different speeds in a smooth movement or abruptly. The movement direction, speed, and other attributes of the gaze tracking test may be selected based on the desired oculometric parameters. As described above, a brightness level of the background may be modified. For example, the background may have a solid gray color. The brightness level of the gray background may be changed from a white background (100% brightness) to a black background (0% brightness).

Figure 3A:
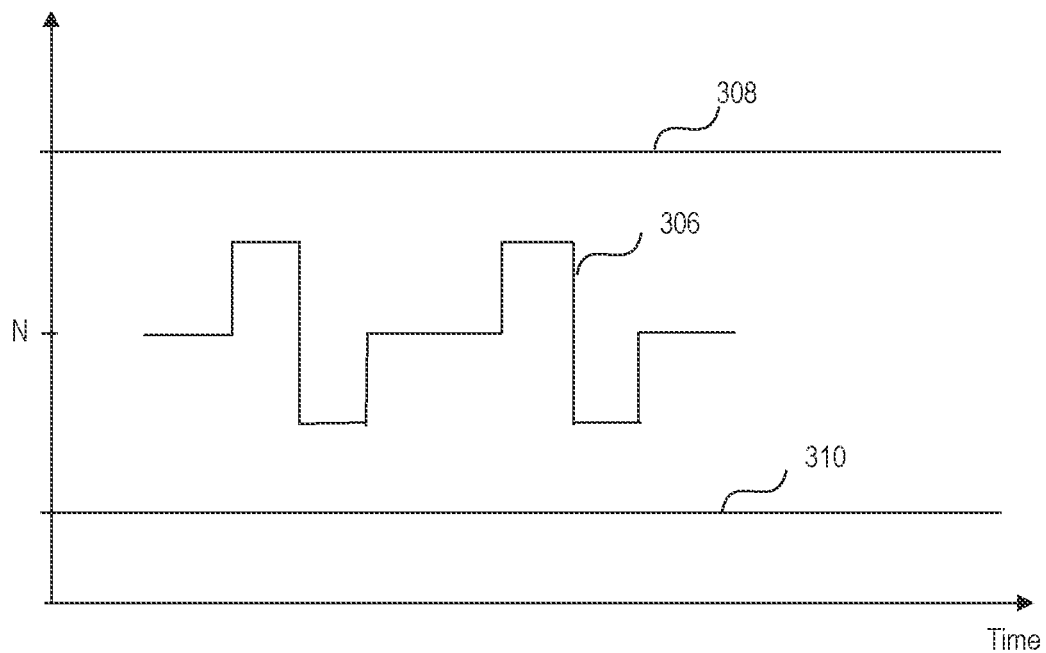
FIG. 3A is a schematic that shows a modulation of a brightness level in a plurality of frames, according to some embodiments.

FIG. 3A is a schematic that shows a modulation of a brightness level in a plurality of frames, according to some embodiments. Graph 306 shows the brightness level of display device 108. As shown by graph 306, the brightness level may be modulated with respect to time (e.g., changed for each displayed frame). The brightness level may be changed around a nominal value N. The change in the brightness level in one or more frames of the plurality of frames is referred to herein as the modulation. The nominal value N may represent a solid background (e.g., gray level) without modulation. In some aspects, a first limit 308 may represent a brightness level equals to twice the nominal value (e.g., may be referred to as +100%). A second limit 310 may correspond to a pure black background (may be referred to as −100%). In some aspects, the brightness level may be changed to a first brightness level (e.g., an upper limit) between the first limit 308 and the second limit 310. For example, the brightness level may be changed to +50% (as shown by graph 306) of the nominal value for a first period (e.g., for 3 frames). Then, the brightness level is changed to a second brightness level below the nominal value. For example, the brightness level may be changed to −50% of the nominal value for a second period (e.g., for 3 frames).

A modulation percentage may be based on a noise level in the received image frames. For example, if the noise level in the image frames is low then the modulation percentage may be decreased (e.g., the brightness level may be modulated between +/−20% of the nominal value). In some aspects, if the noise level in the image frames is high then the modulation percentage is increased (e.g., the brightness level may be modulated between +/−70% of the nominal value).

In some aspects, the modulation may be for a first set number of frames at the first brightness level followed by a second set number of frame at the second brightness level. In other aspects, the modulation may be for a first set of frames at the second brightness level followed by a second set of frames at the first brightness limit. In some aspects, the first set of frames and the second set of frames may be consecutive. In some aspects, the first set of frames and the second set of frames may include the same number of frames. Thus, the average of the modulation is 0%. In some aspects, the first set of frames may include three frames. In some aspects, the second set of frames may include three frames.

For a display device operating at a rate of 60 FPS, each frame duration may be 16.7 milliseconds. Thus, 3 frames or about 16.7×3=50.1 milliseconds at the first brightness level are followed by three frames or about 50.1 milliseconds at the second brightness level.

In some aspects, the number of frames in each set may be selected such that the modulation is not perceived by user 104. In addition, to minimize perception or distraction additional techniques may be implemented as described further below.

Figure 3B:
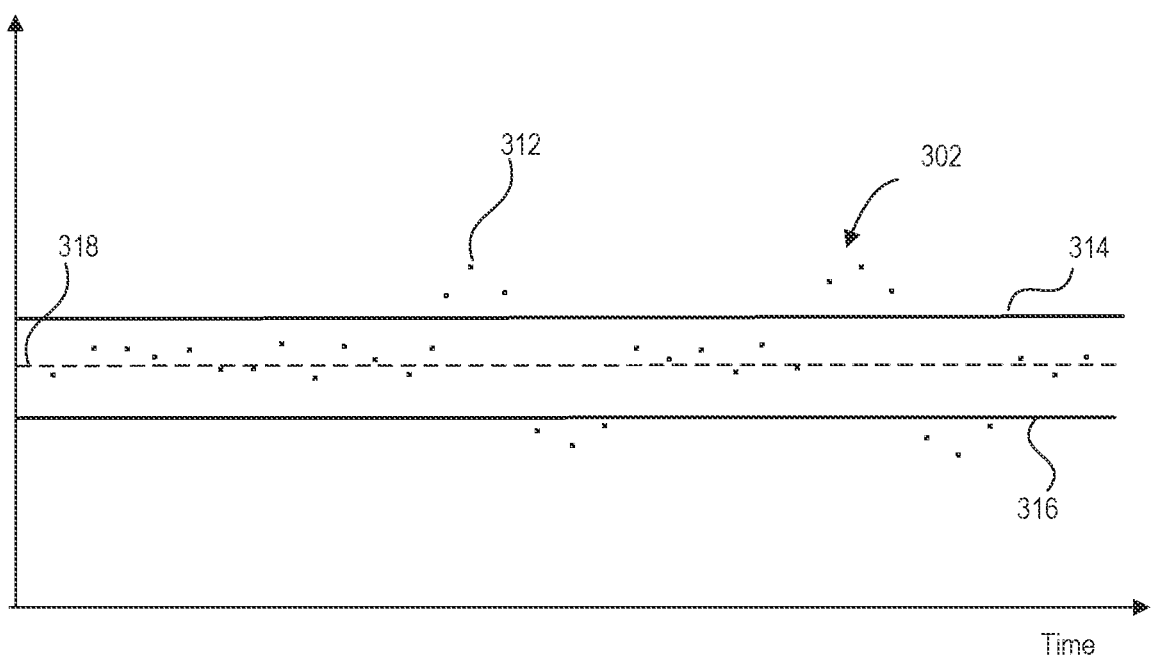
FIG. 3B is a schematic that shows brightness measurements for a plurality of image frames, according to some embodiments.

FIG. 3B is a schematic that shows brightness measurements for a plurality of image frames, according to some embodiments. The brightness measurements may be sampled at a time $T_C$ in each image frame resulting from the transmission shown in FIG. 3A. As described above a brightness measurement corresponding to the image frames may change due to the change in the brightness level in one or more frames of the plurality of frames presented at display device 108. In some aspects, the brightness measurement may correspond to an average of pixel values of the image frame. In some aspects, the average of pixel values of the pixels corresponding to the face of the user is determined. As shown by graph 302, the brightness measurement changes around a received nominal brightness value 318. The received nominal brightness value 318 may be determined based on the brightness measurements corresponding to a plurality of image frames. For example, an average of brightness measurements for a particular number of frames may be determined (e.g., 60 frames). The received nominal brightness value 318 may represent the brightness measurement when the displayed frame has a brightness level equal to the nominal value N. For convenience of calculation, the vertical scales in FIG. 5 may be chosen so that the current received nominal brightness value 318 is aligned with zero. Note that the horizontal axis (time) in FIG. 3B corresponds to the horizontal axis in FIG. 3A.

The brightness measurements may depend on a position of user 104 (e.g., distance from display device 108), reflectance pattern of the user's face, and settings of image sensor 106 (e.g., exposure). Exposure setting of image sensor 106 may be controlled to keep the brightness scale reasonably stable. Each brightness value 312 in graph 302 is the calculated face brightness (mean brightness of the face pixels) minus the received nominal value 318 in FIG. 3B.

The received nominal value 318 may be affected by a plurality of factors (e.g., lighting level in the environment of the user). Thus, computing system 102 may update the value of received nominal value 318 (e.g., continuously or periodically). Computing system 102 may calculate the mean of multiple samples of face brightness. For example, a FIFO queue of 60 samples may be collected in the one second before a first modulation pulse is detected. The received nominal value 318 may correspond to the mean of these 60 samples. For every calculation of mean to set the received nominal value 318, a corresponding standard deviation S is calculated. An upper bound (UB) 314 of noise and a lower bound (LB) of noise may be determined as a function of the standard deviation. In some aspects, UB 314 is set to three times the standard deviation S. LB 316 may be set to minus three times the standard deviation. In some aspects, the measurement of the received nominal value 318 may be updated by pushing each subsequent face brightness measurement that is less than UB 314 and greater than LB 316 into the FIFO queue and recalculating. Each brightness value 312 that is greater than or equal to UB corresponds to the highest brightness indicated in graph 306. Each brightness value 312 that is less than or equal to LB corresponds to the lowest brightness indicated in graph 306. Using the brightness measurements corresponding to the image frames, the time delay may be determined as further described below.

In some aspects, image sensor 106 may employ a rolling shutter mechanism. Exposure of each row of pixels of image sensor 106 is slightly delayed from the exposure of the preceding row of pixels. Determination of the time delay using image frames acquired from an image sensor that employ a rolling shutter mechanism is discussed below.

Figure 4A:
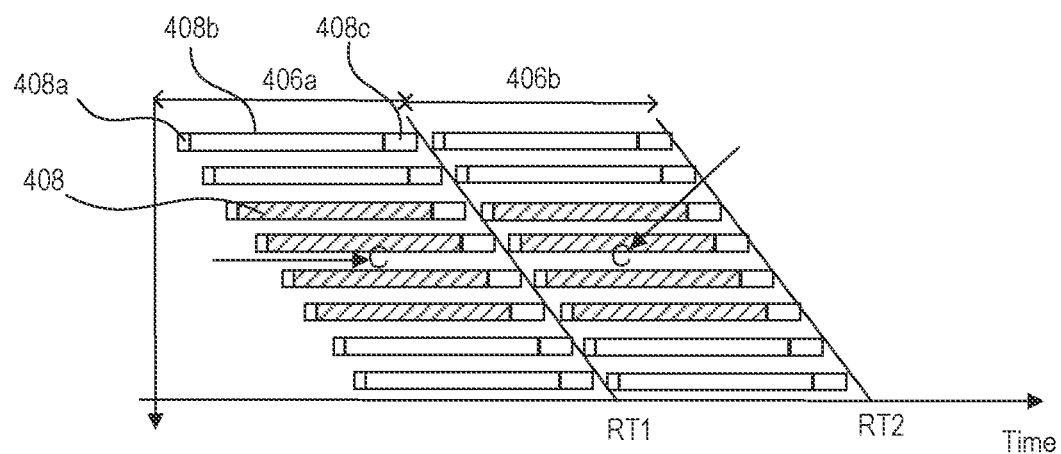
FIG. 4A is a schematic that illustrates rows in a rolling shutter image sensor at full exposure time, according to some embodiments.
Figure 4B:
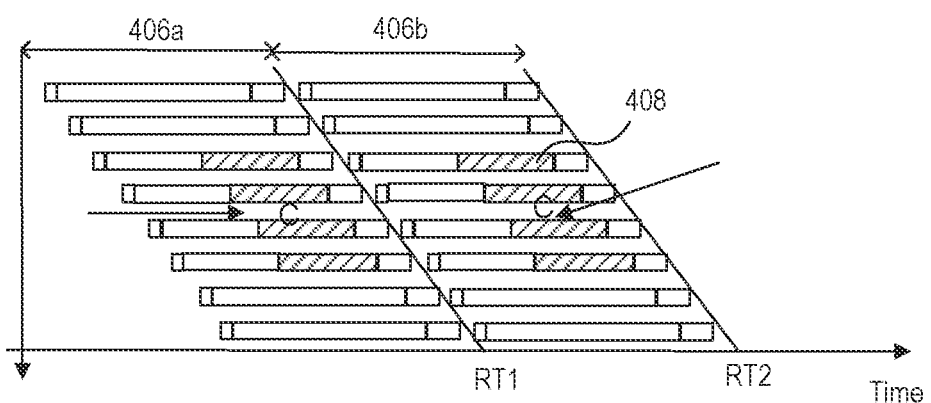
FIG. 4B is a schematic that illustrates rows in the rolling shutter image sensor at half exposure time, according to some embodiments.
Figure 4C:
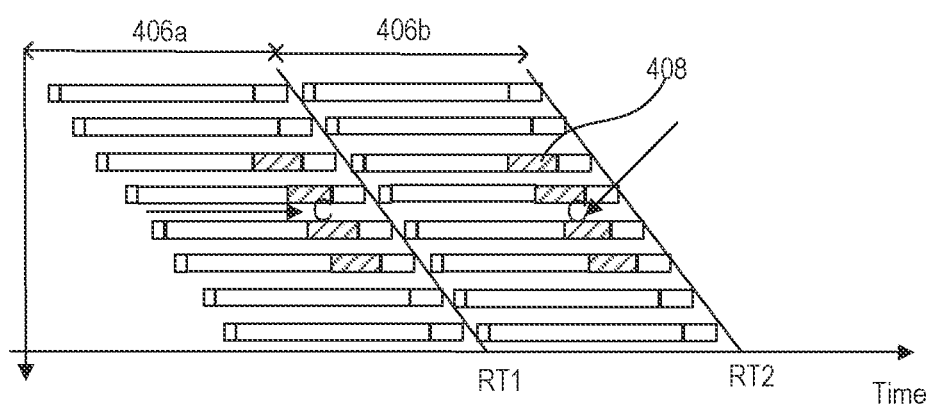
FIG. 4C is a schematic that illustrates rows in a rolling shutter image sensor at short exposure time, according to some embodiments.

FIG. 4A is a schematic that illustrates rows in a rolling shutter image sensor operating at full exposure time, according to some embodiments. FIG. 4B is a schematic that illustrates rows in the rolling shutter image sensor operating at half exposure time, according to some embodiments. FIG. 4C is a schematic that illustrates rows in a rolling shutter image sensor operating at short exposure time, according to some embodiments.

FIGS. 4A-4C show a first image frame 406a and a second image frame 406b. As shown in FIGS. 4A-4C, the readout proceeds from a row to another in a sequential manner from top to bottom with no overlap in the readout time of different rows. Each row 408 is slightly delayed with respect to a preceding row.

As discussed above, some of the pixels are associated with the face of user 104. In the examples shown in FIGS. 4A-4C, the middle rows (e.g., 25% to 75%) may correspond to the face of user 104. In FIGS. 4A-4C, rows corresponding to the face of the user are shown in a shaded pattern. Each row 410 shows a reset time 408a, an exposure time 408b, and a readout time 408c.

FIGS. 4A-4C show rows associated with the face of user 104 in a horizontal direction. However, it is understood that the pixels may also be in a vertical direction due to the orientation of the image sensor (e.g., a 90 degrees change in the orientation of image sensor 106).

As discussed above, a receive timestamp may be associated with each image frame. The receive timestamp is the time at which the readout of the corresponding frame is completed. A first receive timestamp RT1 may correspond to the time at which the readout of first image frame 406a is completed. A second receive timestamp RT2 corresponds to the time at which the readout of second image frame 406b is completed.

A mean brightness value of the face pixels (face brightness) is determined for each image frame. The sampling of face brightness is done during the time indicted by the shaded portion of row 408 in FIGS. 4A-4C. Each face brightness measurement may be located in time by the time coordinate of a centroid of the shaded area that produced it. The centroid is shown as label C in FIGS. 4A-4C.

The time coordinates of the centroids precede the corresponding receive timestamps by an offset. The offset may depend on: (1) a percentage of a frame period from the end of the first row readout to the end of the last row readout, (2) a proportion of exposure, and (3) a vertical position of the face (a horizontal position if the sensor rows are striped vertically across the subject's face). In some aspects, the face of the user may be assumed to be centered in the image frame. Variations in the offset due to a position of the face may be neglected. In other aspects, a position of the face may be determined using face recognition techniques. An adjusted offset for each of the image frame may be determined based on the determined position of the face.

In some aspects, a time coordinate ($T_C$) of the centroid may be determined as follows:

$$T_C = T_{RX} - (0.5 \times O \times FP) - (0.5 \times E \times FP) = T_{RX} - (0.5 \times FP) \times (O + E)$$

where $T_{RX}$ is the receive timestamp, O is the overlap (i.e., the percentage of a frame period from an end of the first row readout to an end of the last row readout), E is an exposure value, and FP is a frame period (e.g., 16.7 milliseconds when image sensor 106 is operating at 60 FPS). The overlap O and the exposure E may be dependent on a type and/or a mode of operation of image sensor 106. In some aspects, the overlap O and/or the exposure E may not be readily known. For example, the value of overlap O in a particular camera sensor design depends on the speed of the shared readout circuitry. The largest overlap can approach 100% when the readout of the last row is completed just before it is switched to read out the first row of the next frame. The smallest overlap may correspond to a faster readout circuitry. Cost and radio frequency (RF) emission considerations push chip designers not to make circuitry any faster than it has to be. For image sensors that are commonly used (e.g., in laptops, smartphones), an overlap equals to 0.9 may be used. However, the overlap may range from about 0.8 to about 1.0.

Exposure values E may range from about 0.1 to about 1.0. Since a good exposure control with typical ambient illumination is near the middle of the range, the exposure E may be assumed to be equal to 0.55. Thus, the selected value of $T_C$ may be expressed as: $T_C=T_{RX}-(0.5\times FP)\times(0.9+0.55) =T_{RX}-0.725\times FP$. The earliest value of $T_C$ is $T_C=T_{RX}-(0.5\times FP)\times(1.0+1.0)=T_{RX}-1.0\times FP$. The latest value of $T_C$ is $T_C=T_{RX}-(0.5\times FP)\times(0.8+0.1)=T_{RX}-0.45\times FP$.

In some aspects, image sensor 106 may employ a global shutter mechanism in which all the pixels of image sensor 106 are exposed at once. The time coordinate ($T_C$) of the centroid may also be determined using the technique described above by using an overlap equal to zero.

Referring back to FIG. 3B, the received nominal value 318 may be used to detect fast changes in indoor illuminance. If the received nominal value changes too much and/or too fast, an ongoing measurement of eye behavior may be aborted and restarted.

The time from commanding display device 108 to change a brightness level ($T_{TX}$) to the earliest detection of the brightness change at image sensor 106 is determined. In particular, the earliest time at which a large down transition in the middle of each up/down pulse pair in the modulation begins to affect image sensor 106, $T_{ED}$ is detected. Thus, the time delay between a monitor display pattern sent by the software and the appearance of the effect of that pattern in the video of the subject received by the software is $T_D=T_{ED}-T_{TX}$.

The face brightness samples of an up/down pulse pair by looking for two consecutive samples above UB 314 is determined. All the succeeding samples until a sample below LB 316 is followed by a sample above LB 316 are added to this sequence of two samples. The last sample above LB 316 is not used. The rest of the typically six samples in the sequence are fitted to a cubic polynomial.

Figure 5:
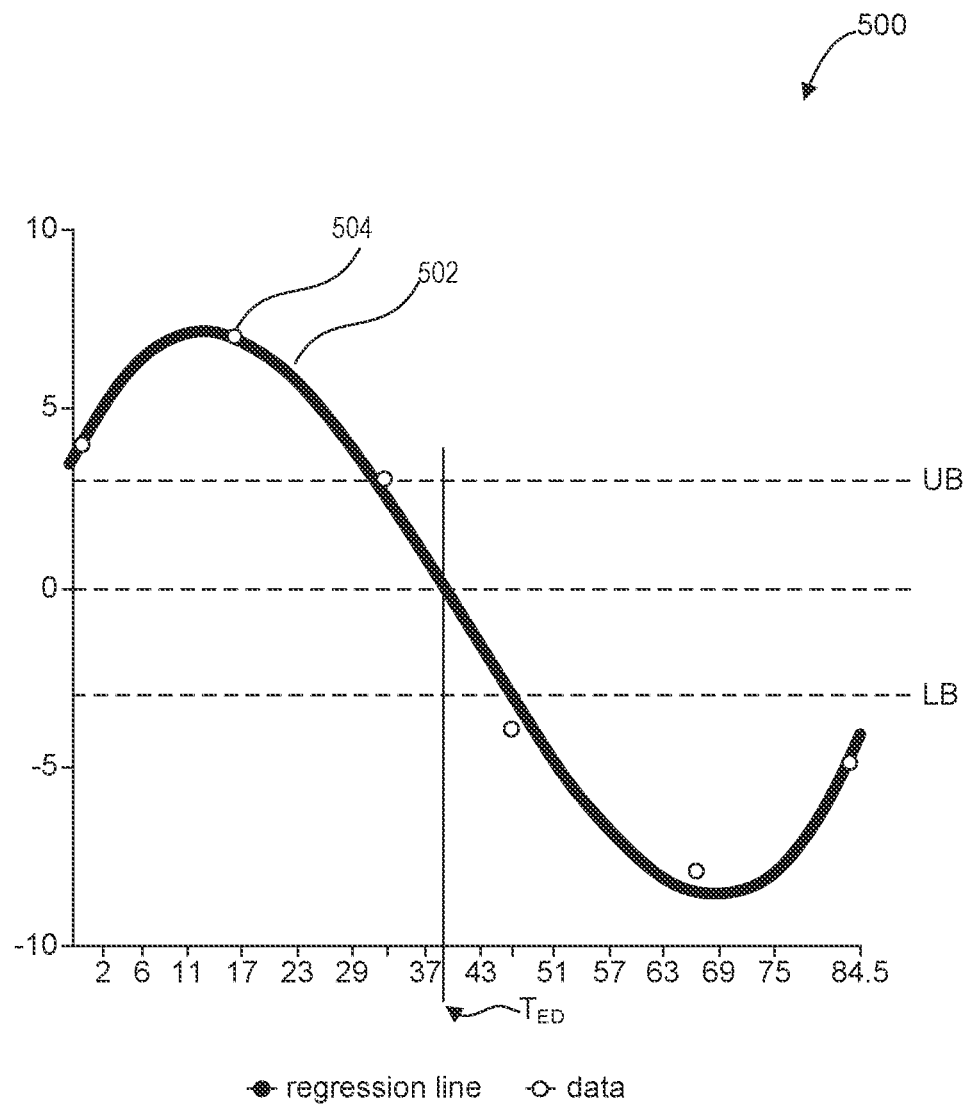
FIG. 5 is a graph that shows fitted brightness measurements, according to some embodiments.

In some aspects, $T_{ED}$ is determined by fitting the face brightness samples of each up/down pulse pair to a cubic polynomial as illustrated in FIG. 5 (e.g., by regression analysis using the method of least-squares).

FIG. 5 is a schematic 500 that shows fitted brightness measurements, according to some embodiments. Graph 504 shows the brightness measurements. Graph 502 shows the fitted data. The horizontal axis is in milliseconds relative to $T_C$ of the first sample. The vertical axis may correspond to the vertical axis of FIG. 3B but with a specific example of scale. The time coordinate of the central zero crossing of this cubic polynomial is $T_{ED}$. From the timestamp $T_{TX}$ of the first frame of the transmitted down pulse, the time delay $T_D=T_{ED}-T_{TX}$ is calculated. This is done for every up/down pulse pair.

In some aspects, the techniques for determining the time delay $T_{ED}$ described herein have the advantage of being robust against errors. For example, the time delay may be determined even when one or more frames are occasionally dropped (e.g., a frame is not displayed by display device 108 and/or an image frame is not transmitted by image sensor 106). This is because four samples are sufficient to specify a cubic polynomial. A useful value for $T_{ED}$ is obtained even when 1 or 2 frames are dropped. Using a higher number of frames (e.g., 5 or 6) provides the advantage of more resistance to variations caused by noise in the image frames.

By way of further illustration, the following is one example algorithm by which time delay determination module 110 may determine a time delay in accordance with some embodiments.

1. Use continuous face detection. For each camera frame, if there is face detection and segmentation with high confidence, then mark FACE = true, else mark FACE = false.

2. Start test sequence with background set to TX Nominal and set ACTIVE = true. At end of test sequence, set ACTIVE = false.
3. Initialize $T_D = 0$.
4. Setup empty TX FIFO queue to save $T_{TX}$ of every large down transition.
5. If ACTIVE and FACE:
    a. Set up 60-element FIFO queue for computation of RX Nominal, collect 60 face brightness samples into the queue, and compute initial values of RX Nominal, UB, and LB.
6. While ACTIVE and FACE:
    a. Set the brightness of the gray monitor background for 3 frame times to +50% from TX Nominal.
    b. Set the brightness of the gray monitor background for next 3 frame times to − 50% from TX Nominal. Push $T_{TX}$ of the first of these frames into TX FIFO.
    c. Set the brightness of the gray monitor background for next 3 frame times to TX Nominal.
7. While ACTIVE and FACE:
    a. Collect brightness value, B. [B is mean brightness of the face pixels minus RX Nominal]
    b. If LB < B < UB:
      i. Push mean brightness of the face pixels into RX Nominal FIFO queue and recompute RX Nominal, UB, and LB.
    c. If B >= UB:
      i. If next face brightness sample is >= UB:
        a. Save this and preceding sample with corresponding $T_C$'s in a sequential list.
        b. Collect each succeeding B sample with its corresponding $T_C$ and add it to the list until (latest sample in list <= LB and next sample > LB) or (length of list > 6)
        c. If (latest sample in list <= LB and next sample > LB):
          i. Use sequential list to compute $T_{ED}$.
          ii. Update $T_D = T_{ED} - T_{TX}$, where $T_{TX}$ is pulled from TX FIFO.

As noted in step 1 of the algorithm, time delay determination module 110 continuously applies a face detection algorithm to each frame of the video acquired by image sensor 106 to find a face with each frame. If time delay determination module 110 determines that a face is detected with a high confidence, it will set the variable FACE to true for that frame, otherwise it will set the variable FACE to false for that frame. Any of a wide variety of well-known techniques for performing face detection with respect to an image may be used to implement the foregoing aspects of the example algorithm.

As noted in step 2 of the algorithm, time delay determination module 110 starts a test sequence (e.g., presenting user 104 with a plurality of frames that include a visual stimulus) with a brightness of the background set to a TX Nominal (corresponding to N in FIG. 3A) at which point the variable ACTIVE is set to true. At the end of the test sequence, time delay determination module 110 may set the variable ACTIVE to false.

As noted in step 3 of the algorithm, time delay determination module 110 may initialize variable $T_D$. For example, time delay determination module 110 may set the variable $T_D$ to zero.

As noted in step 4, time delay determination module 110 sets up an empty TX FIFO queue. Time delay determination module 110 utilizes TX FIFO to store time $T_{TX}$ that corresponds to the time of every large down transition.

Step 5 of the algorithm describes a process to determine the initial values of RX Nominal (corresponding to 318 in FIG. 3B), UB, and LB. For example, as shown in the algorithm if variables ACTIVE and FACE are true, time delay determination module 110 may set up a 60-element FIFO queue. The FIFO queue may be used to collect brightness measurements. Time delay determination module 110 determines 60 brightness measurements and stores the measurement in the 60-element FIFO queue. Time delay determination module 110 determines the initial values of RX Nominal, UB, and LB. For example, time delay determination module 110 determines a mean of the 60 brightness measurements and sets the value of RX Nominal to the mean. In addition, time delay determination module 110 determines the values of UB and LB as a function of RX Nominal.

In this embodiment, steps 6 and 7 operate in parallel.

Step 6 of the algorithm describes a process that controls the brightness level of the display device. For example, as shown in the algorithm, while ACTIVE and FACE are true, a brightness level of a background of display device 108 is set to +50% from TX Nominal for a particular duration. In this example case, the duration is 3 frames. As further noted in step 6, time delay determination module 110 sets the brightness level of a background of display device 108 to −50% from Tx Nominal for the particular duration (e.g., 3 frames). Time delay determination module 110 pushes a time $T_{TX}$ corresponding to the first frame of −50% brightness into TX FIFO. Then, time delay determination module 110 sets the brightness level of the background to TX Nominal for the particular duration (e.g., 3 frames).

Step 7 of the algorithm describes a process of collecting the brightness measurements and determining the time delay based on the collected brightness measurements. As noted in step 7 of the algorithm, while ACTIVE and FACE are true, time delay determination module 110 may collect a brightness value B. In this example, the brightness value is the mean of the face pixels minus the value of RX Nominal. If the brightness value B is greater than LB and less than UB, the mean brightness of the face pixels is pushed into the 60-element FIFO queue. Then, time delay determination module 110 computes new values for RX Nominal, UB, and LB.

As noted in step 7 of the algorithm, if the brightness value B is greater than or equal to UB, then time delay determination module 110 monitors the brightness value B of the subsequent frame. If the brightness value B of the subsequent frame is greater than or equal to UB, the brightness values B and the corresponding $T_c$ for both frames are stored in a sequential list. As noted in step 7, time delay determination module 110 collects each succeeding brightness value B corresponding to subsequent frames with their corresponding $T_c$. The collected brightness values and the corresponding $T_c$ are stored to the sequential list until one or more criteria are satisfied. For example, time delay determination module 110 may stop collecting brightness values B when the brightness value of the last sample is less or equal to LB and the brightness value of the subsequent sample is greater than LB. Time delay determination module 110 may stop collecting brightness values B if a length of the sequential list exceeds a threshold. In this example, the threshold is six. If the brightness value of the last sample is less or equal to LB and the brightness value of the subsequent sample is greater than LB, then time delay determination module 110 determines $T_{ED}$ using the sequential list. Then, the time delay is determined or updated. The time delay $T_D$ is equal to $T_{ED}$ minus $T_{TX}$. Time delay determination module 110 pulls $T_{TX}$ from TX FIFO.

In some embodiments, one or more of the steps may be executed in parallel.

Figure 6:
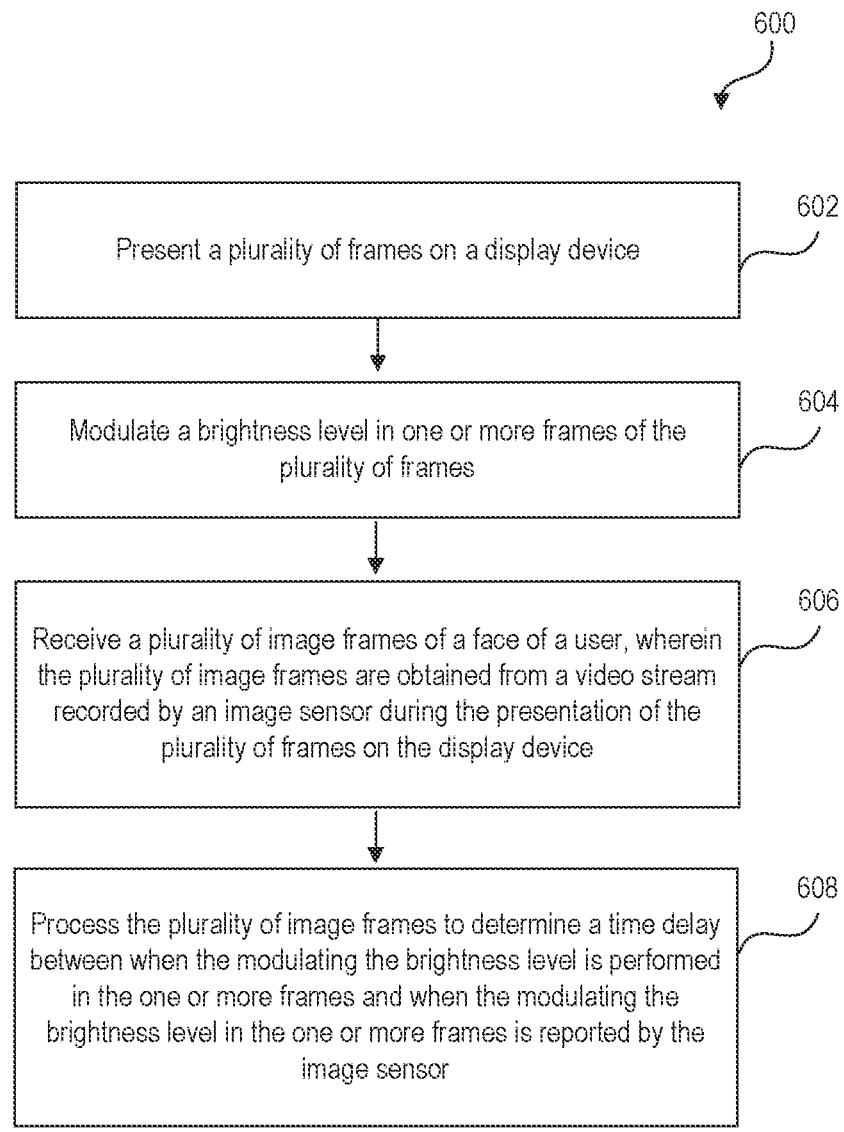
FIG. 6 is an example method for estimating a delay from a display device to a sensor, according to some embodiments.

FIG. 6 is an example method for estimating a delay from a monitor output to a sensor, in accordance with an embodiment of the present disclosure. Method 600 may be performed as a series of steps by a computing unit such as a processor. For example, method 600 may be implemented by computing system 102 and/or computer system 700 of FIG. 7. It is to be appreciated that not all steps may be needed to perform the disclosure provided herein. Further, some of the steps may be performed simultaneously, or in a different order than shown in FIG. 6, as will be understood by one of ordinary skill in the art.

Method 600 shall be described with reference to FIG. 1, however, method 600 is not limited to that example embodiment.

At 602, computing system 102 may present a plurality of frames on a display device.

At 604, computing system 102 may modulate a brightness level in one or more frames of the plurality of frames.

At 606, computing system 102 may receive a plurality of image frames of a face of the user. The plurality of image frames is obtained from a video stream recorded by an image sensor during the presentation of the plurality of frames on the display device.

At 608, computing system 102 may process the plurality of image frames to determine a time delay between the modulating the brightness level is performed in the one or more frames of the plurality of frames and when the modulating the brightness level in the one or more frames of the plurality of frames is reported by the image sensor.

In some aspects, computing system 102 may identify a set of pixels in an image frame of the plurality of image frames. The set of pixels may correspond to the face of the user. Computing system 102 may determine a brightness measurement for the set of pixels. In some aspects, the brightness measurement corresponds to a mean of brightness values of each pixel of the set of pixels. Each brightness measurement is determined at a respective brightness measurement time.

In some aspects, computing system 102 may identify a first set of image frames from the plurality of image frames. The first set of image frames is identified such as a brightness measurement corresponding to each image frame included in the first set exceeds an upper threshold. The upper threshold is greater than a nominal brightness level. Computing system 102 may identify a second set of image frames from the plurality of image frames. The second set of image frames may be identified such that a brightness measurement correspond to each image frame in the second set is less than a lower threshold. The lower threshold is below the nominal brightness level. Image frames of the first set and the second set are consecutive frames. The first set of image frames corresponds to a first set of frames in which the brightness level is changed to a first brightness level. The second set of image frames corresponds to a second set of frames in which the brightness level is changed to a second brightness level lower than the lower threshold.

In some aspects, computing system 102 may determine a transition detection time based on at least respective brightness measurement times for frames of the first set of image frames and the second set of image frames. Computing system 102 may also determine a time delay as a function of the transition detection time and a modulation time. The modulation time corresponds to a time at which the modulating the brightness level is performed in the one or more frames of the plurality of frames. In some aspects, the time delay is a difference between the transition detection time and the modulation time. The transition detection time corresponds to a time at which a change in a brightness level from the first brightness level to the second brightness level is detected by the image sensor. In some aspects, the brightness measurement time is determined based on at least one of a receive timestamp of the received frame, an overlap of frame period, an exposure value of the image sensor, or a duration of the image frame.

In some aspects, computing system 102 may adjust a parameter based on the time delay. The parameter is associated with a response of the user to a stimulus presented in the plurality of frames. For example, the parameter may be an oculometric parameter. The oculometric parameter may be determined from eye data obtained while the stimulus is presented on the display device. For example, a time component of an oculometric parameter may be shifted to compensate for the time delay (e.g., t−x, where x is the determined time delay). Thus, the accuracy of the oculometric parameter is improved. In addition, one or more digital markers indicative of a neurological condition or a mental health condition of the user may be obtained from the oculometric parameters.

In some aspects, display device 108 may include an array of individually controllable pixels associated with a plurality of colors. For example, display device 108 can include a triad (red, green, blue) or other combination of color components. Each color component for each pixel is typically made up of multiple sub-pixels. As used herein the term "pixel" is used to describe the triad of sub-pixels. In some aspects, display device 108 may include multiple light emitting diodes (LEDs). Each LED is a light source that can be either a white LED or on of a variety of colors such as red, green, or blue. In some aspects, a brightness of pixels corresponding to a first color of the plurality of colors may be controlled individually. In some aspects, light source drivers coupled to a LED or to a group of LEDs can control brightness signaling for the LED or the group of LEDs. The brightness may be controlled via analog current or voltage techniques, or via a digital pulse width modulation (PWM).

In some aspects, the red component of pixels may be changed (i.e., modulated as described previously herein) without changing the green or blue component. For example, the brightness of the pixels associated with the red component is modulated between −50% to +50%.

In some aspects, modulating the brightness of the red component of display pixels provides advantages. Red light reflects much better from dark skin tan compared to green or blue light as described in "Quantitative Analysis of Skin using Diffuse Reflectance for Non-invasive Pigments Detection" by Li et al. This provides the advantage of increasing a signal-to-noise ratio for detecting the brightness modulation using the image frames (i.e., based on reflection from the face of the user). In addition, modulating the brightness the red pixel component is less noticeable to the user compared to grey modulation. This is due to the color sensitivity of the human eye. Thus, a larger amplitude of modulation may be used without disturbing the user, and the signal-to-noise ratio is increased.

Figure 7:
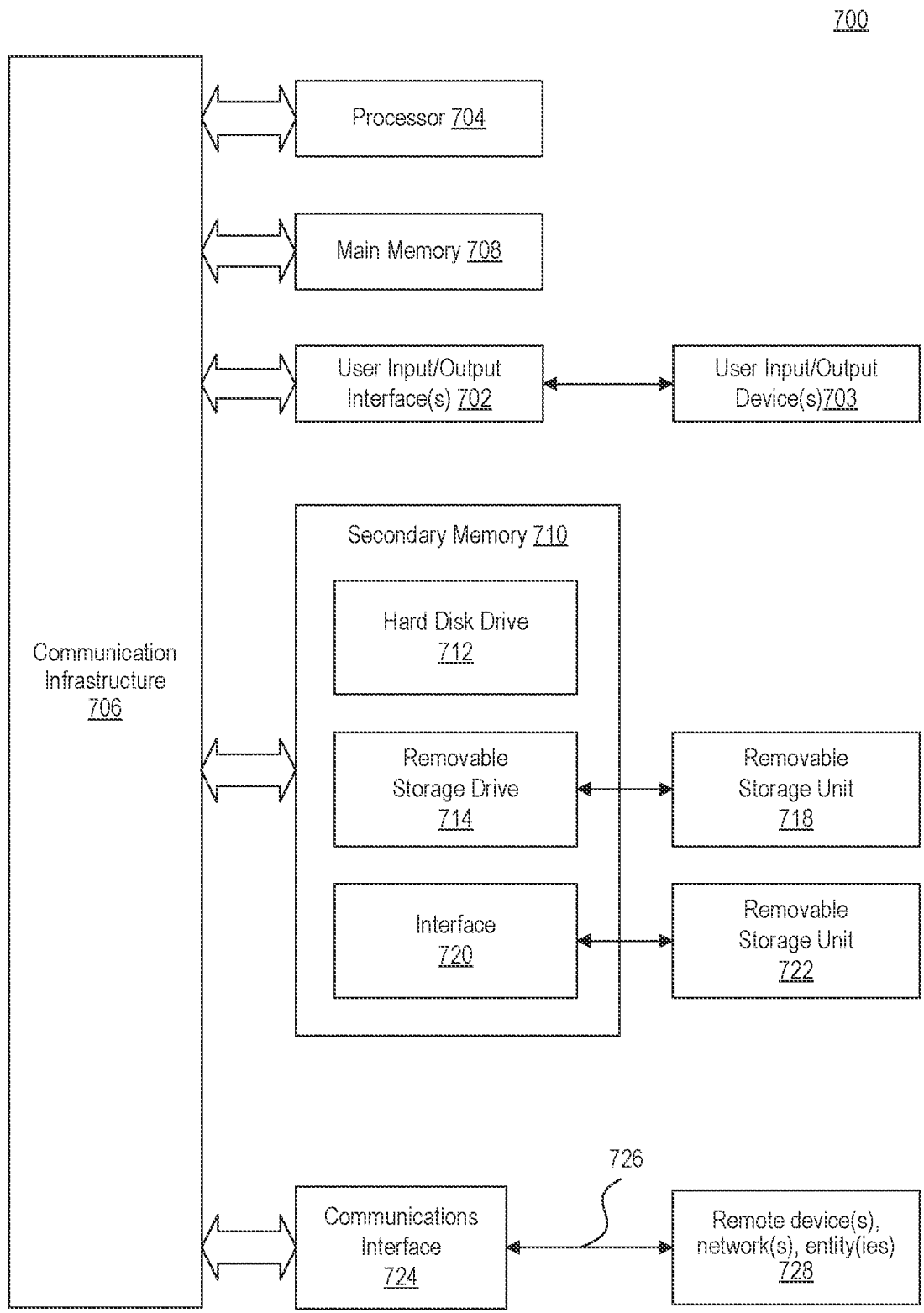
FIG. 7 shows a computer system for implementing various embodiments of this disclosure.

FIG. 7 shows a computer system 700, according to some embodiments. Various embodiments and components therein can be implemented, for example, using computer system 700 or any other well-known computer systems. For example, the method steps of FIG. 6 may be implemented via computer system 700.

In some aspects, computer system 700 may comprise one or more processors (also called central processing units, or CPUs), such as a processor 704. Processor 704 may be connected to a communication infrastructure or bus 706.

In some aspects, one or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

In some aspects, computer system 700 may further comprise user input/output device(s) 703, such as monitors, keyboards, pointing devices, etc., that communicate with communication infrastructure 706 through user input/output interface(s) 702. Computer system 700 may further comprise a main or primary memory 708, such as random access memory (RAM). Main memory 708 may comprise one or more levels of cache. Main memory 708 has stored therein control logic (e.g., computer software) and/or data.

In some aspects, computer system 700 may further comprise one or more secondary storage devices or memory 710. Secondary memory 710 may comprise, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive. Removable storage drive 714 may interact with a removable storage unit 718. Removable storage unit 718 may comprise a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

In some aspects, secondary memory 710 may comprise other means, instrumentalities or other approaches for allowing computer programs and/or other instructions and/or data to be accessed by computer system 700. Such means, instrumentalities or other approaches may comprise, for example, a removable storage unit 722 and an interface 720. Examples of the removable storage unit 722 and the interface 720 may comprise a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some aspects, computer system 700 may further comprise a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may comprise any combination of LANs, WANs, the Internet, etc. Control logic and/or data may be transmitted to and from computer system 700 via communications path 726.

In some aspects, a non-transitory, tangible apparatus or article of manufacture comprising a non-transitory, tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to those skilled in the relevant art(s) how to make and use embodiments of this disclosure using data processing devices, computer systems and/or computer architectures other than that shown in FIG. 7. In particular, embodiments may operate with software, hardware, and/or operating system implementations other than those described herein.

It is to be understood that the phraseology or terminology herein is for the purpose of description and not of limitation, such that the terminology or phraseology of the present disclosure is to be interpreted by those skilled in relevant art(s) in light of the teachings herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While specific embodiments of the disclosure have been described above, it will be appreciated that embodiments of the present disclosure may be practiced otherwise than as described. The descriptions are intended to be illustrative, not limiting. Thus, it will be apparent to one skilled in the art that modifications may be made to the disclosure as described without departing from the scope of the claims set out below.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein.

The breadth and scope of the protected subject matter should not be limited by any of the above-described exemplary embodiments, but should be defined only in accordance with the following claims and their equivalents.

What is claimed is:

1. A computer-implemented method for estimating a time delay for synchronizing one or more eye movement measurements or oculometric parameters, comprising:
   presenting, by at least one computer processor, a plurality of frames on a display device;
   modulating a brightness level in one or more frames of the plurality of frames;
   receiving a plurality of image frames of a face of a user, wherein the plurality of image frames are obtained from a video stream recorded by an image sensor during the presenting of the plurality of frames on the display device;
   processing the plurality of image frames to determine the time delay between when the modulating the brightness level is performed in the one or more frames of the plurality of frames and when the modulating the brightness level in the one or more frames of the plurality of frames is reported by the image sensor, wherein the processing comprises:
      determining a brightness measurement for each frame of the plurality of image frames, wherein each brightness measurement is determined at a respective brightness measurement time;
      identifying a first set of image frames from the plurality of image frames, wherein the brightness measurement corresponding to each image frame of the first set of image frames exceeds or is equal to an upper threshold;
      identifying a second set of image frames from the plurality of image frames, wherein the brightness measurement corresponding to each image frame of the second set of image frames is less than or equal to a lower threshold;
      determining a transition detection time based on at least respective brightness measurement times for frames of the first set of image frames and the second set of image frames; and
      determining the time delay as a function of the transition detection time and a modulation time, wherein the modulation time corresponds to a time at which the modulating the brightness level is performed in the one or more frames of the plurality of frames; and
   adjusting an eye movement measurement or an oculometric parameter based on the time delay, wherein the eye movement measurement or the oculometric parameter is associated with a response of an eye of the user to a stimulus presented in the plurality of frames.

2. The computer-implemented method of claim 1, wherein the processing comprises:
   identifying a set of pixels in an image frame of the plurality of image frames, wherein the set of pixels corresponds to the face of the user; and
   determining the brightness measurement for the set of pixels.

3. The computer-implemented method of claim 2, wherein the brightness measurement corresponds to a mean of brightness values of each pixel of the set of pixels.

4. The computer-implement method of claim 1, wherein the time delay is a difference between the transition detection time and the modulation time.

5. The computer-implemented method of claim 1,
   wherein the first set of image frames corresponds to a first set of frames in which the brightness level is changed to a first brightness level;
   wherein the second set of image frames corresponds to a second set of frames in which the brightness level is changed to a second brightness level; and
   wherein the transition detection time corresponds to a time at which a change in the brightness level from the first brightness level to the second brightness level is detected by the image sensor.

6. The computer-implemented method of claim 1, wherein the brightness measurement time is determined based on at least one of a receive timestamp of an image frame, an overlap of frame period, an exposure value of the image sensor, or a duration of the image frame.

7. The computer-implemented method of claim 1, wherein the time delay includes at least a network delay.

8. The computer-implemented method of claim 1, wherein the display device includes an array of individually controllable pixels associated with a plurality of colors, and wherein the modulating the brightness level comprises:
   controlling a brightness of pixels corresponding to a first color of the plurality of colors.

9. The computer-implemented method of claim 1, wherein the oculometric parameter is a saccadic latency.

10. A system for estimating a time delay for synchronizing one or more eye movement measurements or oculometric parameters, comprising:
    one or more memories; and
    at least one processor each coupled to a least one of the memories and configured to:
      present a plurality of frames on a display device;
      modulate a brightness level in one or more frames of the plurality of frames;
      receive a plurality of image frames of a face of a user, wherein the plurality of image frames are obtained from a video stream recorded by an image sensor during the presentation of the plurality of frames on the display device;
      process the plurality of image frames to determine the time delay between when the modulating the brightness level is performed in the one or more frames of the plurality of frames and when the modulating the brightness level in the one or more frames of the plurality of frames is reported by the image sensor, wherein to process the plurality of image frames, the at least one processor is configured to:
        determine a brightness measurement for each frame of the plurality of image frames, wherein each brightness measurement is determined at a respective brightness measurement time;
        identify a first set of image frames from the plurality of image frames, wherein the brightness measurement corresponding to each image frame of the first set of image frames exceeds or is equal to an upper threshold;
        identify a second set of image frames from the plurality of image frames, wherein the brightness measurement corresponding to each image frame of the second set of image frames is less than or equal to a lower threshold;
determine a transition detection time based on at least respective brightness measurement times for frames of the first set of image frames and the second set of image frames; and
determine the time delay as a function of the transition detection time and a modulation time, wherein the modulation time corresponds to a time at which the modulating the brightness level is performed in the one or more frames of the plurality of frames; and
adjust an eye movement measurement or an oculometric parameter based on the time delay, wherein the eye movement measurement or the oculometric parameter is associated with a response of an eye of the user to a stimulus presented in the plurality of frames.

11. The system of claim 10, wherein to process the plurality of image frames, the at least one processor is configured to:
identify a set of pixels in an image frame of the plurality of image frames, wherein the set of pixels corresponds to the face of the user; and
determine the brightness measurement for the set of pixels.

12. The system of claim 10, wherein the time delay is a difference between the transition detection time and the modulation time.

13. The system of claim 10, wherein the first set of image frames corresponds to a first set of frames in which the brightness level is changed to a first brightness level;
wherein the second set of image frames corresponds to a second set of frames in which the brightness level is changed to a second brightness level; and
wherein the transition detection time corresponds to a time at which a change in the brightness level from the first brightness level to the second brightness level is detected by the image sensor.

14. The system of claim 10, wherein the display device includes an array of individually controllable pixels associated with a plurality of colors, and wherein to modulate the brightness level, the at least one processor is configured to:
control a brightness of pixels corresponding to a first color of the plurality of colors.

15. The system of claim 10, wherein the oculometric parameter is a saccadic latency.

16. A non-transitory computer-readable medium having instructions stored thereon that, when executed by at least one computing device, cause the at least one computing device to perform operations comprising:
presenting a plurality of frames on a display device;
modulating a brightness level in one or more frames of the plurality of frames;
receiving a plurality of image frames of a face of a user, wherein the plurality of image frames are obtained from a video stream recorded by an image sensor during the presentation of the plurality of frames on the display device;
processing the plurality of image frames to determine a time delay between when the modulating the brightness level is performed in the one or more frames of the plurality of frames and when the modulating the brightness level in the one or more frames of the plurality of frames is reported by the image sensor, wherein the processing comprises:
determining a brightness measurement for each frame of the plurality of image frames, wherein each brightness measurement is determined at a respective brightness measurement time;
identifying a first set of image frames from the plurality of image frames, wherein the brightness measurement corresponding to each image frame of the first set of image frames exceeds or is equal to an upper threshold;
identifying a second set of image frames from the plurality of image frames, wherein the brightness measurement corresponding to each image frame of the second set of image frames is less than or equal to a lower threshold;
determining a transition detection time based on at least respective brightness measurement times for frames of the first set of image frames and the second set of image frames; and
determining the time delay as a function of the transition detection time and a modulation time, wherein the modulation time corresponds to a time at which the modulating the brightness level is performed in the one or more frames of the plurality of frames; and
adjusting an eye movement measurement or an oculometric parameter based on the time delay, wherein the eye movement measurement or the oculometric parameter is associated with a response of an eye of the user to a stimulus presented in the plurality of frames.

17. The non-transitory computer-readable medium of claim 16, wherein the oculometric parameter is a saccadic latency.

* * * * *